United States Patent
Fennel et al.

(10) Patent No.: US 7,066,561 B2
(45) Date of Patent: Jun. 27, 2006

(54) METHOD FOR IMPROVING THE CONTROL RESPONSE OF AN ANTILOCK CONTROL SYSTEM DURING BRAKING OPERATIONS IN THE EXISTENCE OF A HIGH COEFFICIENT OF FRICTION

(75) Inventors: Helmut Fennel, Bad Soden (DE); Ivica Batistic, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/495,852

(22) PCT Filed: Nov. 19, 2002

(86) PCT No.: PCT/EP02/12936

§ 371 (c)(1),
(2), (4) Date: Sep. 29, 2004

(87) PCT Pub. No.: WO03/045751

PCT Pub. Date: Jun. 5, 2003

(65) Prior Publication Data

US 2005/0046276 A1 Mar. 3, 2005

(30) Foreign Application Priority Data

Nov. 26, 2001 (DE) .................. 101 57 631
Jun. 6, 2002 (DE) .................. 102 25 121

(51) Int. Cl.
*B60T 8/66* (2006.01)
*B60T 7/12* (2006.01)

(52) U.S. Cl. .................. 303/165; 303/177; 701/71

(58) Field of Classification Search ............... 303/149, 303/150, 154, 155, 156, 165, 177; 701/71, 701/75
See application file for complete search history.

(56) References Cited

U.S. PATENT DOCUMENTS

| | | | | |
|---|---|---|---|---|
| 4,530,059 A | * | 7/1985 | Brearley et al. | 303/154 |
| 5,332,301 A | * | 7/1994 | Roll et al. | 303/156 |
| 5,513,907 A | * | 5/1996 | Kiencke et al. | 303/150 |
| 5,642,920 A | * | 7/1997 | Luckevich et al. | 303/156 |
| 5,775,785 A | | 7/1998 | Harris et al. | |
| 6,109,704 A | | 8/2000 | Batistic | |

FOREIGN PATENT DOCUMENTS

| | | |
|---|---|---|
| DE | 19538545 | 4/1997 |
| EP | 0560271 | 9/1993 |

* cited by examiner

*Primary Examiner*—Thomas J. Williams

(57) ABSTRACT

In a method for improving the control response of an anti-lock control system (ABS) during braking operations at a high coefficient of friction, the brake pressure control thresholds, in particular the intervention or application thresholds of the anti-lock control system (ABS) are adapted dynamically to the adherence abilities of the respective vehicle wheel or the tire.

2 Claims, 3 Drawing Sheets

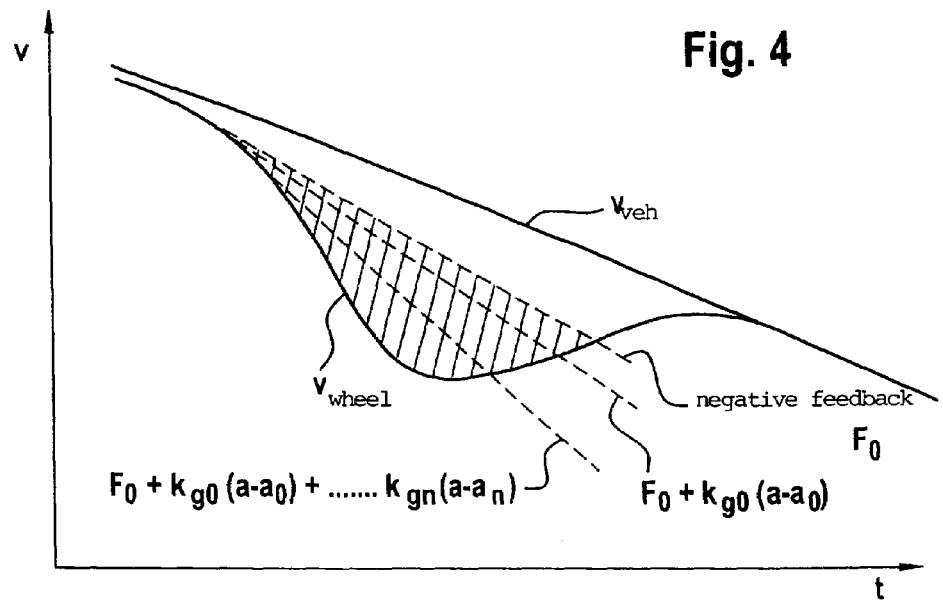
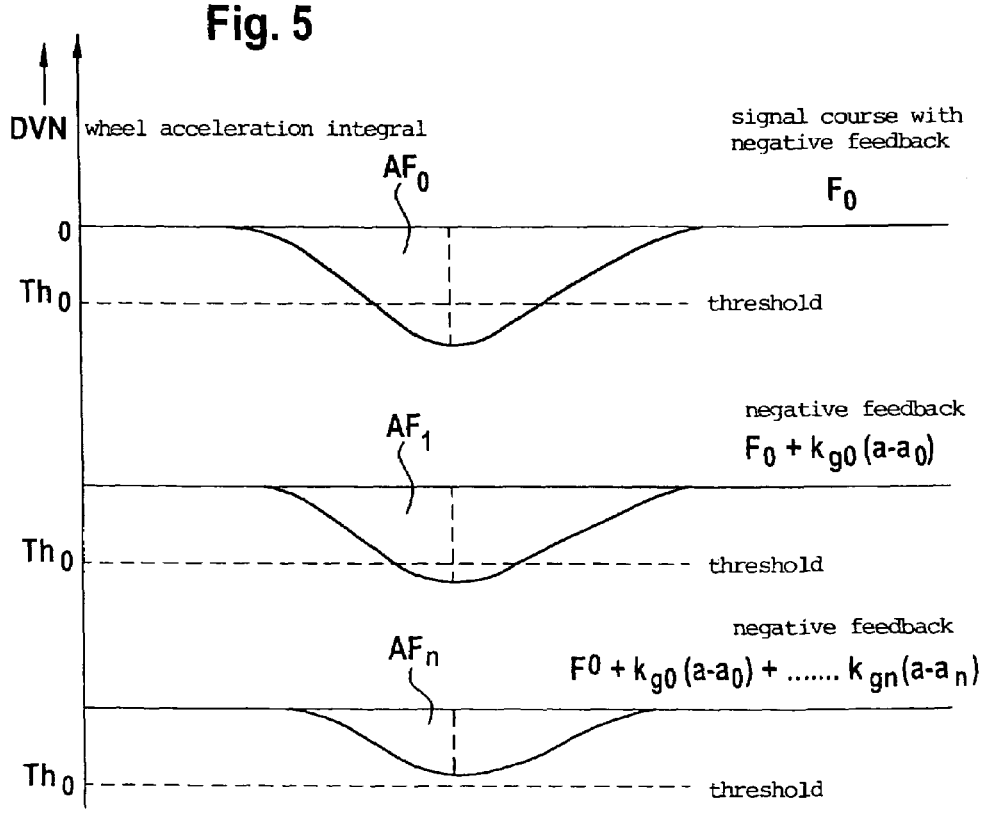

METHOD FOR IMPROVING THE CONTROL RESPONSE OF AN ANTILOCK CONTROL SYSTEM DURING BRAKING OPERATIONS IN THE EXISTENCE OF A HIGH COEFFICIENT OF FRICTION

BACKGROUND OF THE INVENTION

Anti-lock control operations take place in all ranges of coefficients of friction, beginning with a very low coefficient of friction ($\mu<0.1$) on ice until high coefficients of friction ($\mu\approx1$) on dry asphalt.

To reach a shortest possible stopping distance, it is especially important that when braking on roadways with a high coefficient of friction the anti-lock control systems (ABS control systems) will not take up their control activity before the maximum of the so-called $\mu$-slip curve is reached. Otherwise, the ABS system would not utilize the potential of the tire. It would virtually impede the tire in developing the $\mu$-slip curve, and the adherence abilities of the tire would not be utilized in full extent.

To prevent this occurrence, the control thresholds for the ABS braking operation or the control application thresholds must be rated according to the high coefficient of friction conditions.

Recently, the trade press has assessed the braking performance or the stopping distance on dry asphalt at an increasing rate as the decisive criterion for the quality of the tested ABS system. Therefore, the majority of car makers attribute great importance to these tests.

In some of these tests, the vehicles exhibit very high deceleration values. The same vehicles, as soon as they are equipped with different tires, exhibit a distinctly differing braking performance in comparable tests.

Of course, the difference in the performance can be caused because the conditions of measurements differ from each other, e.g. due to differences in the coefficient of friction of the roadway.

However, the specific tests show that the tires partly differ distinctly in the amount of the coefficient of friction, that means the magnitude of the transmittable $\mu$ of the $\mu$-slip curve. This fact explains the significant differences in the braking performance of different tire makes and types of tires under otherwise equal conditions (i.e. identical vehicle, on the same test track, identical climatic conditions, etc.).

The essential thing is to treat different tires in such a fashion that the potential of each individual tire is utilized in the best possible manner. This implies that, on the one hand, the tires with lower transmittable adherence values ($\mu$) are not overbraked (e.g. are excessively subjected to brake slip due to decelerated use of the ABS control) and that, on the other hand, the tires with higher transmittable $\mu$ should not be underbraked (i.e. are not subjected to brake slip at all due to a premature use of the ABS control). The objective rather is to design the ABS control in such a fashion that each tire is controlled according to its optimum.

The anti-lock control systems (ABS systems) used in series do not comprise longitudinal acceleration sensors apart from a few exceptions in the field of all-wheel driven vehicles. Therefore, determining a maximum deceleration responsive to the roadway is only possible based on the wheel speed signals. As long as the wheels are not yet braked, it is no particular problem to determine the vehicle deceleration. Things are different, however, in the event of full braking because the wheels are always afflicted by slip. In this case, the vehicle speed and the vehicle deceleration $a_{veh}=\Delta v_{veh}/\Delta t$ can be determined only in approximation with the use of the prior-art methods by determining and logically combining the wheel rotational behavior of the individual wheels and selecting defined control phases.

In anti-lock control systems, the deceleration $a=\Delta v/\Delta t$, determined either according to the prior-art method or measured by means of a longitudinal acceleration sensor, represents the input value in a progression term which is taken into account for calculating the control thresholds and control application thresholds of the anti-lock control (ABS control). The deceleration and the so-called negative feedback define the application of the ABS control. The negative feedback represents the wheel deceleration value at which the stable branch of the $\mu$-slip curve has not yet been left, i.e. wheel slip 'does not yet show', because the maximum transmittable adherence or coefficient of friction ($\mu$-value) has not yet been reached or, specifically, where the ABS control has not yet commenced if it is designed properly.

The negative feedback is deducted from the currently prevailing wheel deceleration $a_{wheel}$ for calculating the control application thresholds. Only when the wheel deceleration exceeds the negative feedback value will this be identified as a locking tendency, and the discrepancy from the negative feedback is detected, integrated and evaluated. The integral represents an essential criterion for the detection of an ABS situation, i.e. an ABS control operation or a locking tendency.

If the value of the negative feedback or of the control threshold is too low, a tire with a relatively high transmittable adherence value ($\mu$) is subjected to the ABS control prematurely, i.e. still in the stable range of the $\mu$-slip curve, and, thus, is virtually hindered to utilize the instantaneously existing tire/road adherence value. The stopping distance becomes longer than would be necessary in view of road conditions and the adherence ability of the tire.

If, however, the value of the negative feedback or of the control threshold is too high, a tire with a relatively low transmittable adherence value ($\mu$) is subjected to ABS control too late, i.e. only far in the unstable range of the $\mu$-slip curve, and, thus, is virtually forced into deep slip up to a wheel lock condition. The result would be an 'inhomogeneous' ABS control with excessive pressure modulation. This would cause major losses in comfort and a significant impairment of the braking performance.

Therefore, an object of the invention is to develop a method permitting a still better adaptation of an ABS control system to the different adherence values dependent on the wheel or on the type of tire.

SUMMARY OF THE INVENTION

It has been found out that this object can be achieved by a method involving that during braking operations at a high coefficient of friction, the brake pressure control thresholds, in particular the intervention or application thresholds of the anti-lock control system (ABS) are adapted dynamically to the adherence abilities of the respective wheel, in particular the tire.

The above-described objective of the individual adaptation of the ABS control system to the tires can principally be achieved in two ways, i.e. by raising the control thresholds and/or by increasing the negative feedback in dependence on the respective conditions.

According to a particularly favorable embodiment of the invention, the control thresholds, on which the commencement of anti-lock control depends, are raised progressively by increasing the negative feedback (F) according to the relation $$F=F_0+k_{g0}*(a-a_0)+k_{g1}*(a-a_1) \ldots +k_{gn}*(a-a_n) \quad (1),$$

where "$F_0$=Feedback$_0$" refers to the minimum negative feedback value, where "$a_0$" represents the input value at which the progression commences, where the quantities "$a_1 \ldots _n$" are vehicle deceleration values at which the progression is switched over, and where "a" is the current vehicle deceleration and "$k_{g0} \ldots _{gn}$" are valuation factors.

In another embodiment of the invention, the control thresholds (Th), on which the commencement of anti-lock control depends, are raised progressively according to the relation $$Th=Th_0+k_{ao}*(a-a_0)+k_{a1}*(a-a_1) \ldots +k_{an}*(a-a_n) \quad (2).$$

In this case, "Th"$_0$ is the minimum threshold value, "$a_0$" is the input value of the vehicle deceleration at which the progression commences; the quantities "$a_1 \ldots _n$" are vehicle deceleration values at which the progression is switched over; "a" is the current vehicle deceleration and "$k_{a0} \ldots _{an}$" are valuation factors.

The increase must be progressively dependent on the vehicle deceleration in both cases. The term 'control thresholds' refers to acceleration thresholds or thresholds derived therefrom, such as diverse derivatives or integrals as well as slip thresholds and reference speed.

In both cases, i.e. adaptation of the control thresholds and the negative feedback, the application thresholds are influenced directly or indirectly by way of the measured or calculated vehicle deceleration.

The progression commences at the vehicle deceleration that can be reached by the 'weakest' tires. The vehicle deceleration of roughly 1 to 1.1 g ('g' implies the acceleration due to gravity constant) represents a value relevant in practice. Of course, defined fixed values must be added during uphill or downhill driving.

All tires reaching this input value without the ABS control setting in will naturally develop a higher vehicle deceleration and automatically increase the control thresholds or the negative feedback. This way the tires with a higher coefficient of friction are automatically controlled with a higher threshold or negative feedback.

The attached illustrations and diagrams serve for the more detailed explanation of the mode of operation of the invention.

BRIEF DESCRIPTION OF THE DRAWINGS

In the accompanying drawings,

FIGS. 4, 5 show diagrams for illustrating the mode of operation when applying a progressive negative feedback.

DETAILED DESCRIPTION OF THE DRAWINGS

Figure 1:
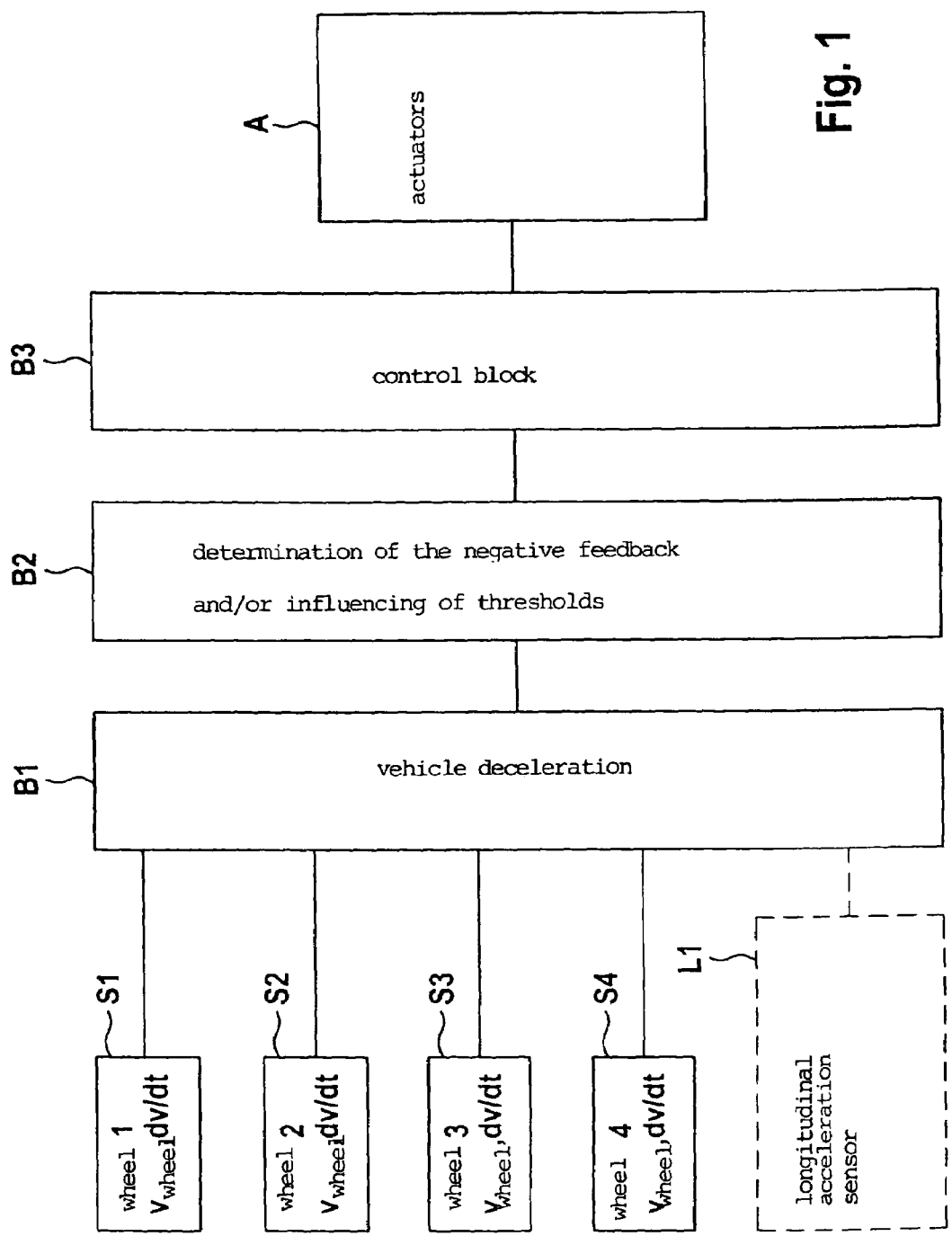
FIG. 1 shows essential components of an ABS control system in the form of function blocks.

According to the basic principle of an ABS control system as represented in FIG. 1, the input signals of the control system are procured by means of wheel sensors S1 to S4 representative of the rotational behavior (speed $v_{wheel}$ and acceleration dv/dt) of the individual vehicle wheels wheel 1 to wheel 4. In addition, an acceleration sensor L1 can be installed for determining the longitudinal acceleration of the vehicle.

Such circuit variants are known in the art. A vehicle (reference) speed is determined from these measured variables in a circuit B1 illustrated as a block, the said speed's variation finally representing the vehicle acceleration or vehicle deceleration $a_{veh}$, respectively.

B2 symbolizes the negative feedback and/or the influencing of thresholds according to the invention. In B3 the above-mentioned data is processed in a conventional manner in order to obtain control signals for actuators A, especially for brake pressure or brake force actuators for controlling the brake pressure or the brake force at the individual vehicle wheels.

Figure 2:
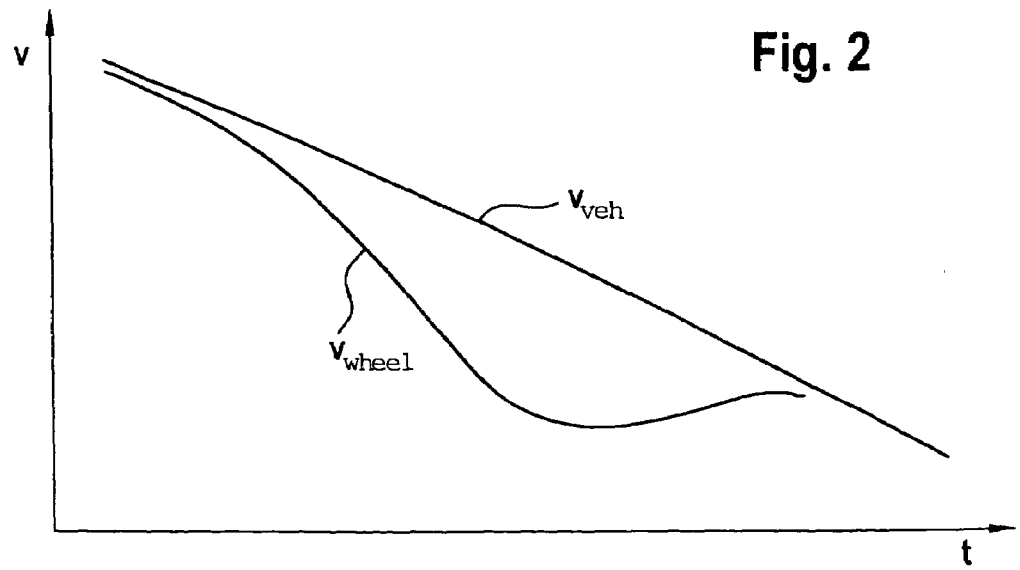
FIGS. 2, 3 show diagrams for illustrating the course of the wheel speed and vehicle speed and of the wheel acceleration in the initial phase of an ABS control operation.
Figure 3:
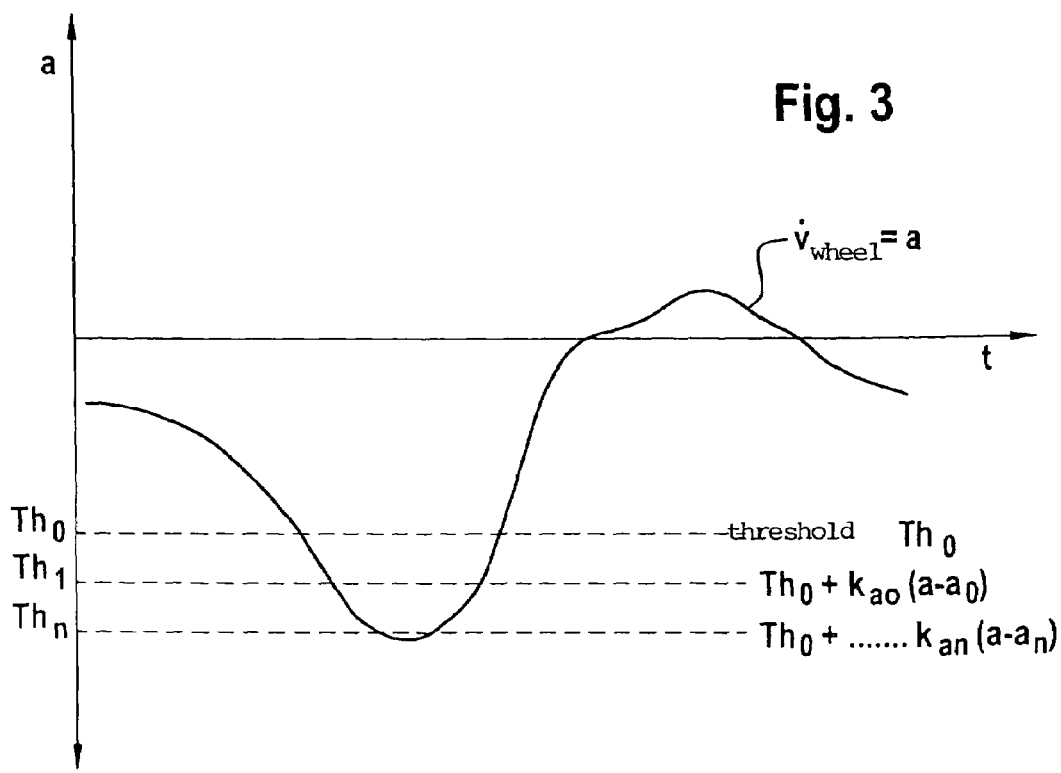

FIGS. 2 and 3 depict the vehicle speed $v_{veh}$ and the speed $v_{wheel}$ of the controlled wheel under review and the variation or time derivative of this wheel speed $a_{wheel}$. The values for the stepwise adaptation of the control thresholds of the invention as explained in the following are also plotted in FIG. 3.

The thresholds Th are increased according to the following equation (1). It applies for the progressive development of threshold values:

$Th_0$=base threshold $$Th_1=Th_0+k_{ao}*(a-a_0)$$

$$Th_n=Th_0+Th_1 \ldots +k_{an}*(a-a_n)$$

$$Th=Th_n=Th_0+k_{ao}*(a-a_0)+k_{a1}*(a-a_1) \ldots +k_{an}*(a-a_n)$$

"$Th_0$" is the minimum threshold value. The value "$a_0$" represents the input value, where the progression starts, the quantities $a_1 \ldots _n$" are vehicle deceleration values at which the progression is switched over, "a", being identical with $a_{cc}$ in FIG. 3, is the current vehicle deceleration and "$k_{a0} \ldots _{an}$" are valuation factors. The current vehicle deceleration must exceed the respective switch-over value in order that the individual parts of this polynomial are taken into account.

The following applies for the increase of the negative feedback. The negative feedback is increased according to the equation (2):

$F_0$=base value of the negative feedback $$F_1=F_0+k_{g0}*(a-a_0)$$

$$F=F_n=F_0+F_1 \ldots +k_{gn}*(a-a_n) \quad (2)$$

"F" is referred to as progressive feedback. "$F_0$=Feedback$_0$" is the minimum negative feedback value. The value "$a_0$" represents the input value, at which the progression commences, the quantities "$a_1 \ldots _n$" are vehicle deceleration values, at which the progression is switched over, "a" is the current vehicle deceleration and "$k_{g0} \ldots _{gn}$" are valuation factors. The individual parts of this polynomial will apply as soon as the current vehicle deceleration exceeds the respective switch-over value.

The adaptation or increase of the negative feedback in some cases is the preferred simpler variant in comparison to the increase of the acceleration thresholds because influencing by way of the vehicle deceleration can take place at a central location in the control system.

FIG. 4 serves to illustrate the function and the mode of operation of a progressive negative feedback. The dotted straight lines in FIG. 4 apply when the individual terms $F_0$, $F_1$, $F_n$ of the above-mentioned negative feedback function F are included.

In FIG. 5 the wheel acceleration integrals DVN are illustrated in the curve course or control case according to FIG. 4. For example, a value of −4 km/h could be provided for the base threshold $Th_0$.

When taking into account only the negative feedback value $F_o$, the shaded surface $AF_0$ bound by the wheel speed $V_{wheel}$ and the straight line $F_o$ symbolizes the wheel acceleration integral DVN that is decisive for determining the ABS application threshold (FIG. 5). The surface $AF_1$, $AF_n$ becomes smaller when the further terms of the negative feedback equation apply.

In both cases, that means both in the progressive increase of the control thresholds and in the progressive increase of the negative feedback, the progression is indicated as a sum of several linear functions. It is, of course, possible to choose any other form of mathematical progression; the simple form has proven fully appropriate in practice.

The invention claimed is:

1. A method for improving the control response of an anti-lock control system (ABS) of a wheeled vehicle during braking operations at a high coefficient of friction,
   wherein brake pressure control thresholds of the anti-lock control system (ABS) are adapted dynamically to the adherence abilities of the respective wheel, and
   wherein the control thresholds, on which the commencement of anti-lock control depends, are raised progressively by increasing negative feedback (F) according to the relation $$F = F_0 + k_{g0}*(a-a_0) + k_{g1}*(a-a_1) \ldots + k_{gn}*(a-a_n) \quad (1),$$

where "$F_0$=Feedback$_0$" refers to a minimum negative feedback value, where "$a_0$" represents an input value at which the progression commences, where the quantities "$a_{1 \ldots n}$" are vehicle deceleration values at which the progression is switched over, and where "a" is a current vehicle deceleration and "$k_{g0 \ldots gn}$" are valuation factors.

2. A method for improving the control response of an anti-lock control system (ABS) of a wheeled vehicle during braking operations at a high coefficient of friction,
   wherein brake pressure control thresholds of the anti-lock control system (ABS) are adapted dynamically to the adherence abilities of the respective wheel, and,
   wherein the control thresholds (Th), on which the commencement of anti-lock control depends, are raised progressively according to the relation $$Th = Th_0 + k_{a0}*(a-a_0) + k_{a1}*(a-a_1) \ldots + k_{an}*(a-a_n) \quad (2),$$

where "$Th$"$_0$ is a minimum threshold value, "$a_0$" is an input value of the vehicle deceleration at which the progression commences, where the quantities "$a_{1 \ldots n}$" are vehicle deceleration values at which the progression is switched over, and where "a" is a current vehicle deceleration and "$k_{a0 \ldots an}$" are valuation factors.

* * * * *